(12) United States Patent
Wild et al.

(10) Patent No.: US 10,080,967 B2
(45) Date of Patent: Sep. 25, 2018

(54) METHOD AND SYSTEM PROVIDING SPECTATOR INFORMATION FOR A MULTIMEDIA APPLICATION

(71) Applicant: MICROSOFT TECHNOLOGY LICENSING, LLC, Redmond, WA (US)

(72) Inventors: Nicholas B. Wild, Seattle, WA (US); Thomas A. Langan, Seattle, WA (US); Tian F. Lim, Seattle, WA (US); Vipul V. Hingne, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 926 days.

(21) Appl. No.: 14/506,885

(22) Filed: Oct. 6, 2014

(65) Prior Publication Data
US 2015/0024851 A1 Jan. 22, 2015

Related U.S. Application Data

(63) Continuation of application No. 12/187,467, filed on Aug. 7, 2008, now Pat. No. 8,874,661.

(51) Int. Cl.
*A63F 13/65* (2014.01)
*A63F 13/86* (2014.01)
(Continued)

(52) U.S. Cl.
CPC .............. *A63F 13/65* (2014.09); *A63F 13/35* (2014.09); *A63F 13/86* (2014.09); *H04L 67/24* (2013.01);
(Continued)

(58) Field of Classification Search
CPC ..... A63F 13/86; A63F 13/12; A63F 2300/577
See application file for complete search history.

(56) References Cited

U.S. PATENT DOCUMENTS

| 6,889,257 B1 | 5/2005 | Patel |
| 6,999,083 B2 | 2/2006 | Wong et al. |
| (Continued) | | |

OTHER PUBLICATIONS

Bharambe, A. R. et al., "Supporting Spectators in Online Multiplayer Games", 2004, http://conferences.sigcomm.org, 6 pages.
(Continued)

*Primary Examiner* — David L Lewis
*Assistant Examiner* — Eric M Thomas
(74) *Attorney, Agent, or Firm* — Alleman Hall Creasman & Tuttle LLP

(57) ABSTRACT

A method and system for allowing spectators to experience multimedia information over a network generated by an online video game running on a participant's device comprises a participant system and a universal spectator client system. A participant may utilize a device to experience game play. Each spectator may also have an associated device, which may allow the spectator to receive multimedia information generated by the participant system over a network. A spectator may experience multimedia information generated by a participant regardless of whether the spectator has the same title installed on an associated device and regardless of whether the associated spectator device provides the same capabilities and functionality as the participant device.

20 Claims, 14 Drawing Sheets

(51) Int. Cl.
*H04L 29/08* (2006.01)
*H04L 29/06* (2006.01)
*A63F 13/35* (2014.01)

(52) U.S. Cl.
CPC .......... *H04L 67/325* (2013.01); *H04L 69/04* (2013.01); *A63F 2300/203* (2013.01); *A63F 2300/577* (2013.01)

(56) References Cited

U.S. PATENT DOCUMENTS

| | | | |
|---|---|---|---|
| 2002/0002074 A1 | 1/2002 | White | |
| 2002/0032056 A1 | 3/2002 | Oh | |
| 2002/0032771 A1 | 3/2002 | Gledje | |
| 2002/0183115 A1 | 12/2002 | Takahashi | |
| 2003/0038805 A1 | 2/2003 | Wong et al. | |
| 2003/0130040 A1* | 7/2003 | Dripps .................... | A63F 13/12 463/42 |
| 2003/0220143 A1* | 11/2003 | Shteyn .................... | A63F 13/12 463/42 |
| 2004/0082831 A1 | 4/2004 | Kobashikawa | |
| 2006/0058103 A1 | 3/2006 | Danieli et al. | |
| 2007/0019068 A1 | 1/2007 | Arseneau et al. | |
| 2007/0101383 A1 | 5/2007 | MacIntosh et al. | |
| 2007/0117617 A1 | 5/2007 | Spanton et al. | |
| 2007/0117635 A1 | 5/2007 | Spanton et al. | |
| 2008/0108437 A1 | 5/2008 | Kaarela et al. | |
| 2008/0119286 A1* | 5/2008 | Brunstetter ............. | A63F 13/00 463/43 |
| 2008/0125226 A1 | 5/2008 | Emmerson | |
| 2009/0259767 A1 | 10/2009 | Karlsson et al. | |

OTHER PUBLICATIONS

Drucker, S.M. et al., "Spectator Games: A New Entertainment Modality for Network Multiplayer Games", Downloaded Dec. 15, 2008, http://research.microsoft.com, 7 pages.
Halper, N. et al., "Action Summary for Computer Games: Extracting Action for Spectator Modes and Summaries", 2003, Department of Simulation and Graphics, 8 pages.
Smash Bros. DOJO Update: Spectator Mode, Nov. 15, 2007, http://www.gamegrep.com/previews, 3 pages.

* cited by examiner

METHOD AND SYSTEM PROVIDING SPECTATOR INFORMATION FOR A MULTIMEDIA APPLICATION

CROSS REFERENCE TO RELATED APPLICATIONS

This application is a continuation of U.S. patent application Ser. No. 12/187,467 filed on Aug. 7, 2008, the entire contents of which are herein incorporated herein by reference in their entireties.

BACKGROUND

The sophistication of computer gaming has steadily increased since the early days of computer based games. Modern computer games provide sophisticated multimedia environments involving 3-D graphics and sound to gamers and may allow multiplayer interaction over a network such as the Internet. Gaming enthusiasts typically play computer games on a platform, which may be, for example, a personal computers or dedicated gaming consoles such a the Xbox Video Game Console manufactured by Microsoft Corporation.

The rich depth of modern gaming generates gaming communities of enthusiasts who may desire to share their experiences, tips, hints, opinions, etc. It is desirable to share an actual multimedia experience between a gamer and an interested spectator. In particular, providing interested spectators access to the experience of a particular game provides a self-sustaining marketing environment for game titles and gaming platforms in which spectators may become immersed in the multimedia experience of game play before they have actually purchased a particular game title or gaming platform. In addition, as games have become rich multimedia experiences unto themselves, viewing of game play may become of interest to the general public regardless of whether they ultimately desire to play the game.

However, several issues arise with respect to providing spectators access to a gaming environment. First, the spectator may not have access to the same platform as the gamer. The platforms on which spectators may desire to experience game play may provide a heterogeneous set of resources for graphics and sound generation. In addition, potential spectators may be coupled to a network with varying degrees of bandwidth capability. For example, a spectator may own a personal computer but not a gaming console on which a gamer plays a particular title. Alternatively, a spectator may have access to the same platform as a gamer but may not have installed the specific title on their platform that they desire to observe.

Thus, a need exists for a method and system in which interested spectators may observe game play of a gamer on a wide variety of platforms and regardless of whether the spectators have access to the gaming title itself or the platform on which the game is played.

SUMMARY

According to one embodiment, a method and system for allowing spectators to experience multimedia information over a network generated by an online video game running on a participant's device comprises a participant system and a universal spectator client system. A participant may utilize a device to experience game play. Each spectator may also have an associated device, which may allow the spectator to receive multimedia information generated by the participant system over a network. A spectator may experience multimedia information generated by a participant regardless of whether the spectator has the same title installed on an associated device and regardless of whether the associated spectator device provides the same capabilities and functionality as the participant device.

A participant system may be installed on a device associated with a participant of a video game that may wish to share the participant's user experience with one or more spectators. The spectator system may comprise a participant process and a participant interface process. The participant process may perform functions to capture information from a frame buffer on the participant system and an audio buffer on the participant system, render the information as a multimedia signal, encode the multimedia signal and transmit the multimedia signal to spectators. The participant interface process may display a GUI to a participant that shows current game play as well as information relating to online spectators categorized by particular video games. A universal spectator client may be installed on each device associated with a potential spectator. The universal spectator client may comprise a spectator process and a spectator interface process. The spectator process may operate to receive encoded multimedia signals for video games generated by a participant system on a participant device and display the multimedia information. The spectator interface process may provide a GUI to allow spectators to select games they desire to observe as well as view the online status of participants. The universal spectator client may be scalable and may be installed on a heterogeneous array of possible spectator devices.

A spectator server may comprise a spectator/participant negotiation process to negotiate spectator sessions between participants and one or more spectators as elected by the participants and spectators. The spectator server may also comprise a spectator database that may store information regarding spectators and participants as well as permissions information in which participants may designate which spectators are allowed to view a particular video game. The spectator server may also track online status for participants and spectators in order to update the participant systems and universal spectator clients of the status of potential users.

Using the SACS, users may identify themselves with one or more community groups, which identify users having certain shared values, preferences, viewpoints, ideologies, etc. At least one content descriptor may be defined, which indicates an attribute or feature that content may exhibit to a varying extent.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION OF ILLUSTRATIVE EMBODIMENTS

Figure 1A:
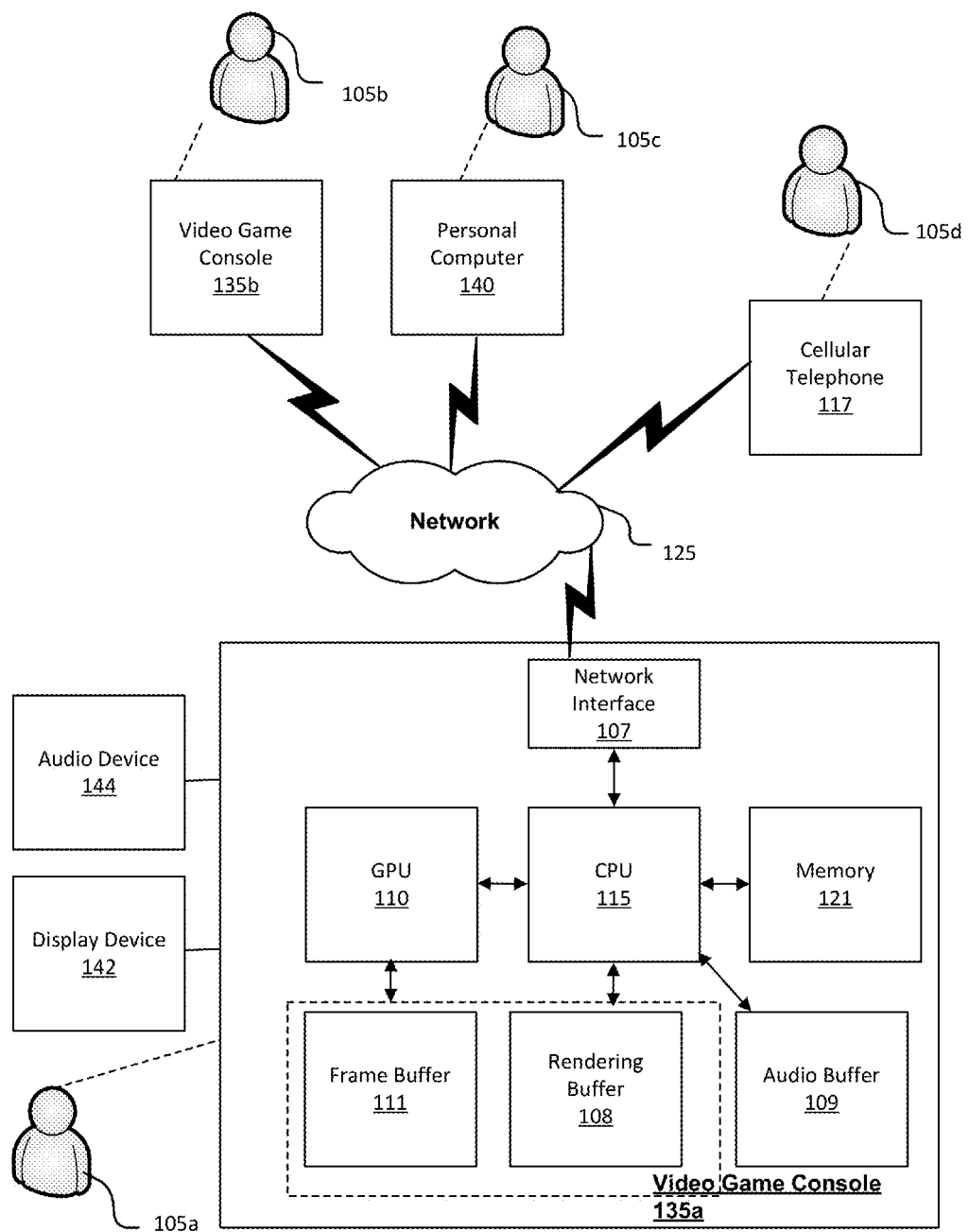
FIG. 1A detects an exemplary environment in which a spectator system may be deployed.

FIG. 1A detects an exemplary environment in which a spectator system may be deployed. An arbitrary number of users 105a-105d may each be associated with a respective device having various functionality and capabilities. For example, user 105a may be associated with video game console 135a, user 105b may be associated with the videogame console 135b, user 105c may be associated with a personal computer 140 and user 105d may be associated with a cellular telephone 117. The devices may exhibit heterogeneous functionality and capabilities. For example, the capabilities of video game consoles 135a 135b may differ markedly from the capabilities of cellular telephone 117 as far as processing power, graphics capability, the ability to render audio, etc. Each of the devices, i.e., video game console 135a, videogame console 135b, personal computer 140 and cellular telephone 117 in each be coupled to a network 125, which may be the Internet and associated World Wide Web.

Each user 105a-105d may act as a participant in playing a video game or as a spectator in experiencing the game play conducted by another user who is acting as a participant. Whether a user 105a-105d acts as a participant or spectator may depend upon the particular status and configuration of their respective device.

Devices 135a, 135b, 140 and cellular telephone 117 may each provide a platform for hosting a video game providing a multimedia to a respective user incorporating graphics and sound. A video game also referred to herein as a video game title or title may comprise program instructions, resources, multimedia content involving sound and graphics etc., which when executed on a respective device may provide a multimedia experience to a user.

A participant system (shown in FIG. 1B) may be deployed on any of the devices 135a, 135b, 140 and 117 in order to share the respective user's 105a-105d gaming experience with other users acting as spectators via network 125. Thus, a participant system deployed on a device may allow a user to act as a participant sharing his or her game play with others. For example, user 105a using video game console may run a particular game title on videogame console 135a and may desire to share his or her experience with users one 105b-105d. A participant system may be deployed on videogame console 135a in order to provide shared experience of user 105a acting as participant to users 105b-105d acting as spectators. The participant system may capture multimedia information from the running title on video game console 135a and provide that multimedia information to users 105b-105 via network 125. The participant system may provide the multimedia information from the running game title on video game console 135a regardless of whether users 105b-105d acting as spectators have the same game title installed on their respective devices as that running on video game console 135a and regardless of whether the devices 105b-105d have the same capabilities or functionality as videogame console 135a.

An expanded view of a video game console 135a on which a participant system may be deployed is also shown in FIG. 1A. Video game console 135a may include network interface 107, GPU ("Graphics Processing Unit") 110, CPU ("Central Processing Unit") 115, frame buffer 111, audio buffer 109 and rendering buffer 108. CPU 115 may provide a general purpose computer that may concurrently execute any number of processes or tasks. Video game titles running on videogame console 135a (not shown in FIG. 1) may each comprise a process or task executed by CPU 115. Memory block 121 may store program instructions and/or data relating to processes or tasks executed by CPU 115. Thus, CPU 115 may retrieve or store data in memory block 121 in order to perform processing. For example, videogame titles may be stored in memory block 121 and CPU 115 may access these instructions.

GPU 110 may provide a specialized and dedicated processor for performing graphics processing and rendering. GPU 110 may utilize frame buffer 111 and rendering buffer 109 in order to perform graphics processing and rendering. Frame buffer 111 may be a video output device that displays a video display from a complete frame of data. Information in frame buffer 111 may comprise color values for every pixel to be displayed on a display device 140. Data in frame buffer 111 may be subject to further processing and rendering by GPU 111 the result of which may be stored in rendering buffer 109. Additional rendering may include personal information of a user 105a.

Audio buffer 109 may store rendered audio data relating to a video game title executing on video came console 135. Data stored in audio buffer may be digital audio samples of audio information.

CPU 110 may interact with network interface 107 to cause information to be transmitted over network 125. In addition, CPU 110 may interact with network interface 107 in order to receive information transmitted over network 125, for example, for other users such as users 105b-105d. Video game console 135a may output rendered video for display on display device 142 and rendered audio for playback on audio device 144.

Figure 1B:
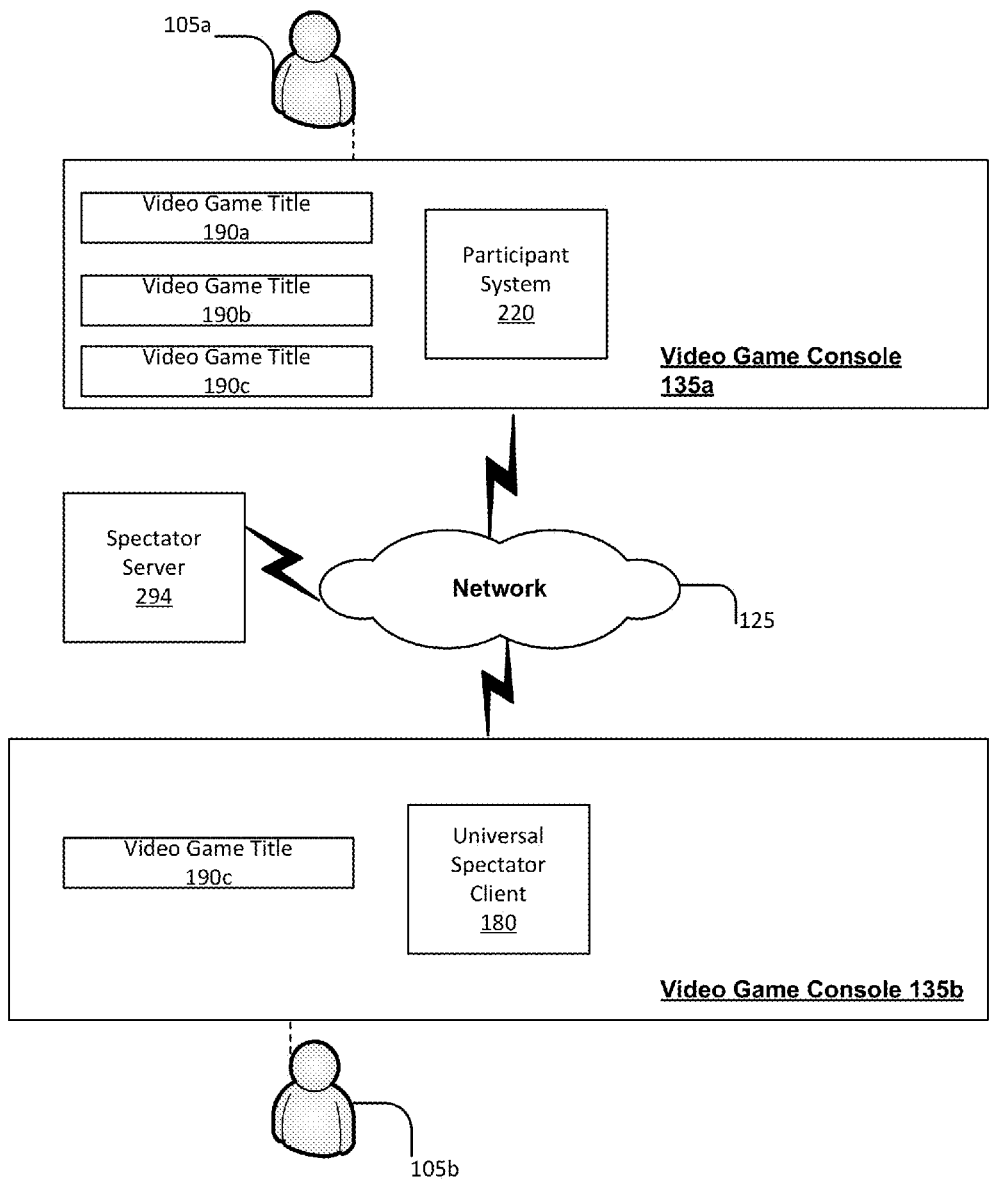
FIG. 1B depicts an exemplary deployment of a participant system for sharing multimedia information for a video game with spectators.

FIG. 1B depicts an exemplary deployment of a participant system for sharing multimedia information for a video game with spectators. User 105a may be associated with video game console 135a while user 105b may be associated with video game console 135b. User 105a may have installed video game titles 190a-190c on video game console 135a while user 105b may have installed only video game title 190c on video game console 135b. User 105a may desire to share, for example, multimedia information related to game play for video game title 190*a* running on video game console 135*a* with user 105*b* even though video game title 190*a* is not installed on video game console 135*b*. Thus, participant system 220 installed on a particular device allows a respective user to act as a participant and therefore share game play experience with others who act as spectators. Although FIG. 1B shows participant system 220 installed only on a single device (video game console 135*a*), it should be understood that participant system 220 may be installed on a number of devices.

To accomplish this, participant system 220 (described in detail below) may be deployed on video game console 135*a* and universal spectator client 180 described in detail below may be installed on video game console 135*b*. Universal spectator client 180, in general, operates to receive and render received multimedia information on a device and therefore allows a user who has installed universal spectator client 180 to act as a spectator. Universal spectator client 180 may be a scalable process that may be adapted to run on any type of device and account for the respective capabilities of that device. Thus, although FIG. 1B shows only a single device with a universal spectator client 180 deployed, it should be understood that a universal spectator client 180 may be deployed on any number of devices coupled to network 125 so that users of those respective devices may act as spectators with respect to game play on video game console 135*a*.

Spectator system 220 may capture multimedia information generated during game play of video game title 190*a* concurrently with the running of video game title 190 on video game console 135*a*, render, encode and transmit the multimedia information via network 125 to universal spectator client 180 deployed on video game console 135*b*.

Spectator server 294 may maintain state information regarding spectators online and connected to network 125 and their online status as well as participants connected to network 125 and their online status. Spectator server 294 may retrieve this information and provide appropriate information to participant system 220 so that participant system 220 can display a list of available spectators to user 105*a* using video game console 135*a*. Similarly, spectator server 294 may provide information regarding participants and games available to be viewed by potential spectators via, for example, universal spectator client 180 on video game console 135*b*.

It should be understood that a user may act as a participant alone with respect to certain video games, as a spectator alone with respect to certain video games and/or as a spectator and participant with respect to particular video games. Thus, although FIG. 1B shows spectator system 220 and universal client 180 as installed on different devices, it should be understood that spectator system 220 and universal client 180 may be installed on a single device allowing an associated user for that device to act both as a participant and as a spectator with respect to particular video games.

Figure 2A:
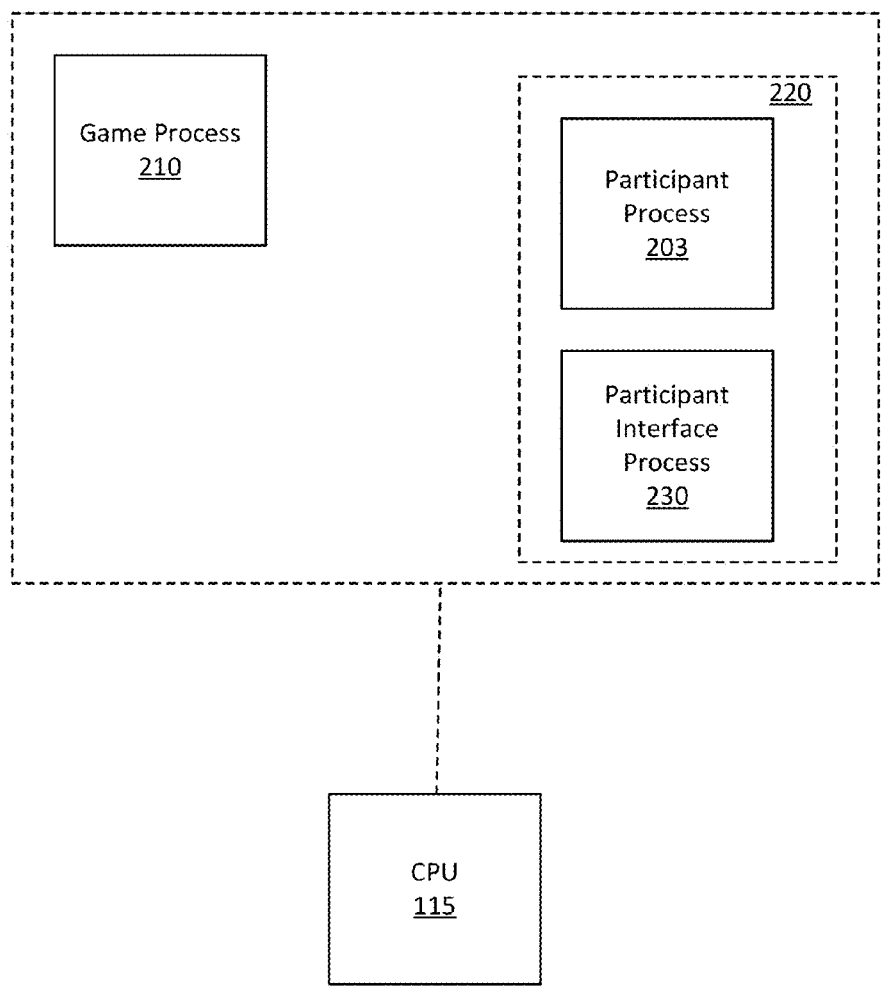
FIG. 2A shows an exemplary structure of a participant system according to one embodiment.

FIG. 2A shows an exemplary structure of a participant system according to one embodiment. Participant system 220 may be deployed on a device associated with a user that desires to act as a participant and thereby share multimedia information for running game titles with other users acting as spectators. For example, participant system 220 may be deployed on video game console 135*a* in order to allow user 105*a* to act as a participant and thereby share game play with users 105*b*-105*d* acting as spectators.

Spectator system 220 may comprise one or more processes or tasks executed by CPU 115 as well as state data. For example, as shown in FIG. 2A, spectator system 220 may comprise a participant process 203 and participant interface process 230. The details of a participant process 203 and spectator interface process will be described in detail below. As depicted in FIG. 2A, spectator system 220 may execute concurrently with other tasks or processes running on CPU 115 and in particular a game process 210 for which a user acting as a participant may desire to share multimedia information with other users acting as spectators. Although FIG. 2A only shows one such concurrently running game process 210, it should be understood that any number of game processes may run concurrently with participant system 220 on CPU 115.

Figure 2B:
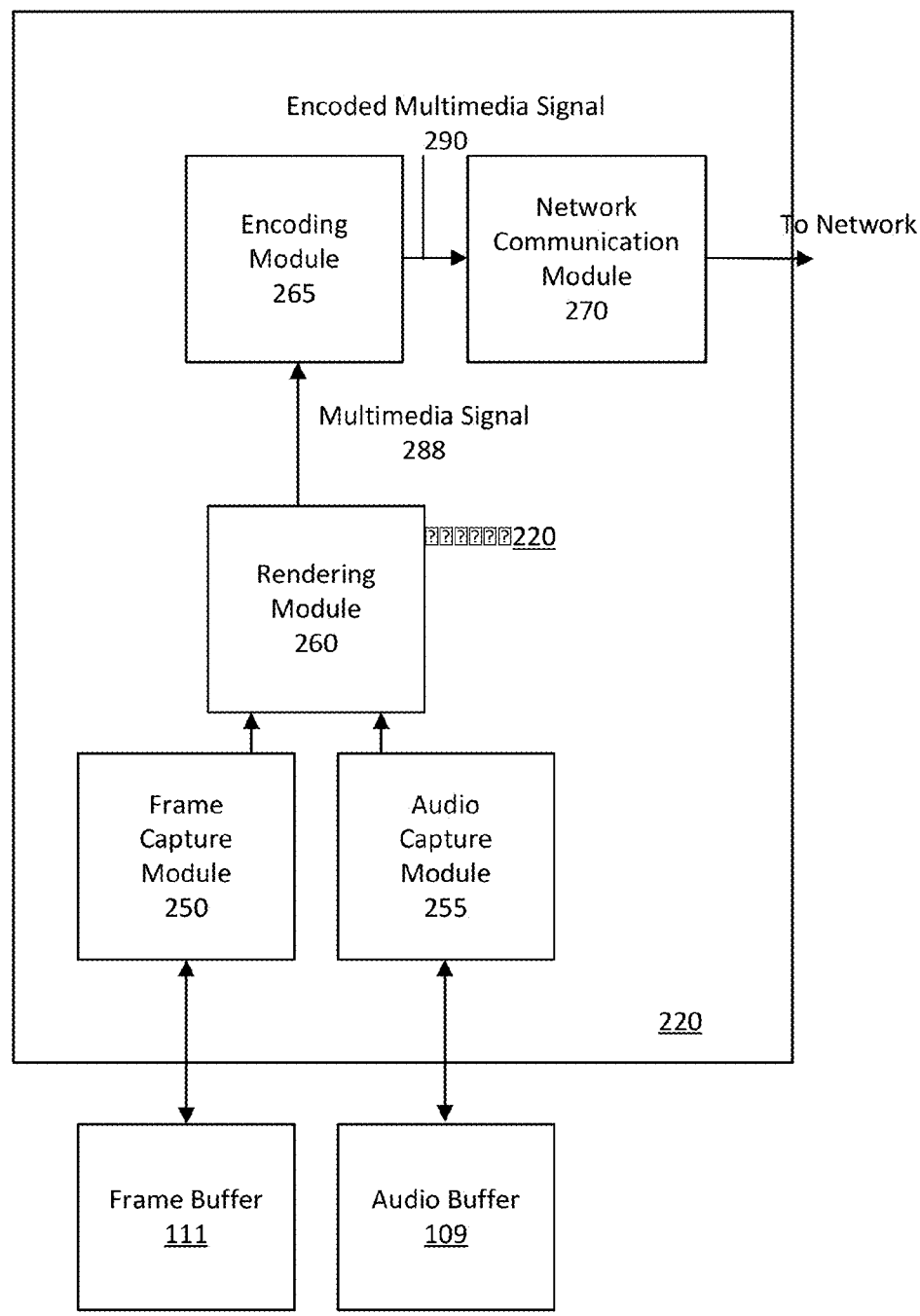
FIG. 2B shows an exemplary architecture of a participant process according to one embodiment.

FIG. 2B shows an exemplary architecture of a participant process according to one embodiment. Participant process 220 may comprise frame capture module 250, audio capture module 255, rendering module 260, encoding module 265 and network communication module 270. It is assumed that participant process 220 runs on a device associated with a user that desires to act as a participant with respect to one or more video games and share this information with spectators. Thus, participant process 220 may run on a device that includes an exemplary architecture such as that shown in FIG. 1*a* and may include a CPU 115, GPU 110, memory 121, network interface 107, frame buffer 111, audio buffer 109 and rendering buffer 108.

Frame capture module 250 may retrieve video data from frame buffer 111 on a periodic basis. Similarly audio capture module 255 may retrieve audio data from audio buffer 109 on a periodic basis. Video data retrieved by frame capture module 250 and audio data retrieved by audio capture module 255 are provided to rendering module 260, which multiplexes video and audio data into a single multimedia signal 288, which is then provided to encoding module 265. Encoding module may perform any type of encoding or compression on the multimedia signal 288 received from rendering module 260. For example, encoding module 265 may employ MPEG or other suitable encoding and compression scheme to the multimedia signal 288 to generate an encoded multimedia signal 290 which may then be provided to network communication module 270. Network communication module performs packetization and other data preparation in order to prepare for the transmission of the encoded multimedia signal for transmission over a network such as network 125.

Figure 2C:
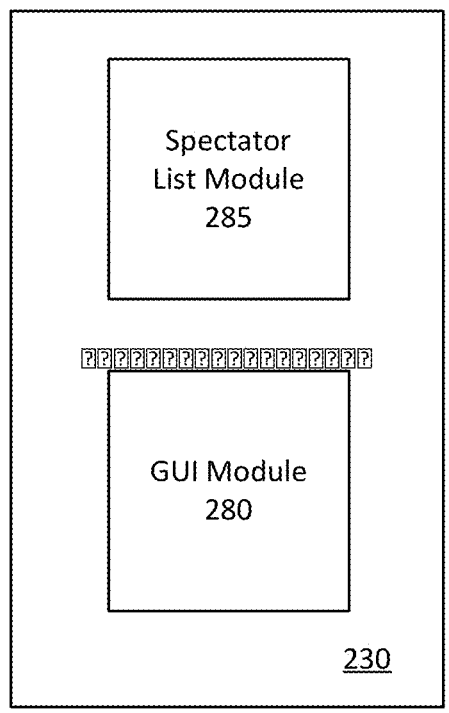
FIG. 2C shows an exemplary architecture of a participant interface process according to one embodiment.

FIG. 2C shows an exemplary architecture of a participant interface process according to one embodiment. Participant interface process 230 may comprise spectator list module 285 and GUI module 280. Participant interface process 230 may update information to a user acting as a participant regarding spectators that are online and wish to observe game play for a particular game. As will be described in detail below, a participant may allow or disallow certain other users from acting as spectators with respect to particular games. A participant may desire to disallow another from acting as a spectator for various reasons. For example, if a certain game involves a high degree of violence, a game player might desire to disallow potential spectators under a certain age from viewing game play. GUI module 280 may provide functionality for displaying a user interface for a spectator process as described in detail below.

Participant list module 285 may retrieve a list of all spectators sorted by game that are currently online via, for example, spectator server 294 shown in FIG. 1B as described below. GUI module 280 may display the retrieved information using a dedicated participant GUI described in detail below.

Figure 2D:
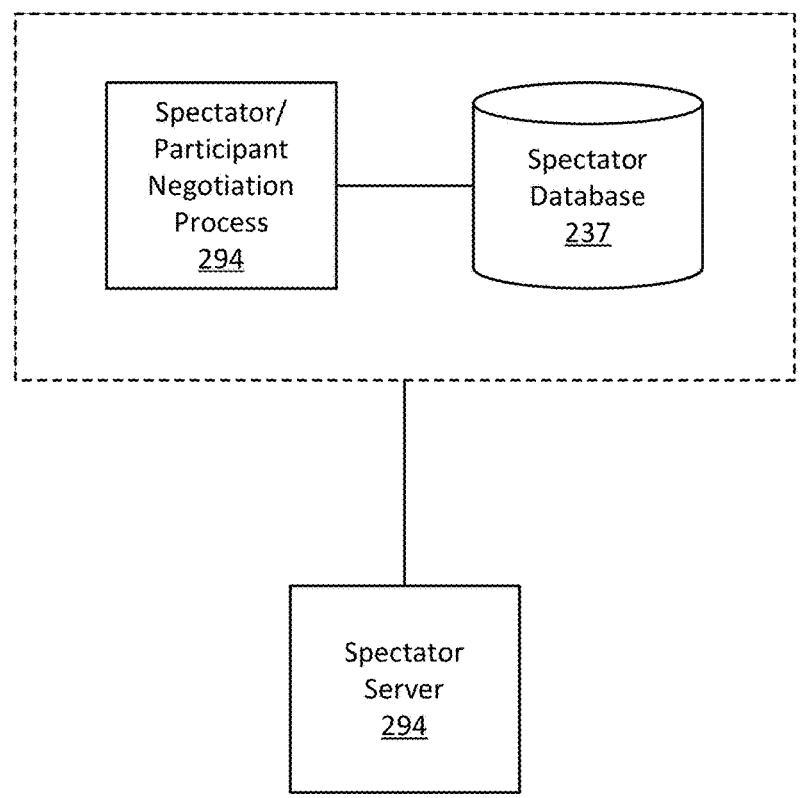
FIG. 2D shows an exemplary architecture of a spectator server according to one embodiment.

FIG. 2D shows an exemplary architecture of a spectator server according to one embodiment. Spectator sever 294 may comprise spectator/participant negotiation process 294 and spectator database 237. Spectator database 237 may store and update state and permissions information relating to participants and spectators with respect to particular video games as well as keep track of particular user's allowed or disallowed status and additional information regarding the platform capabilities of devices utilized by particular spectators. An exemplary schema of a spectator database 237 is described below.

Spectator/participant negotiation process 294 may be a process executed on spectator server 294. Spectator/participant negotiation process 294 may perform negotiation functions to allow particular spectators to experience game play of particular participants. In particular, as described in detail below, spectator/participant negotiation process 294 may utilize state information stored in spectator database to perform this negotiation.

Figure 2E:
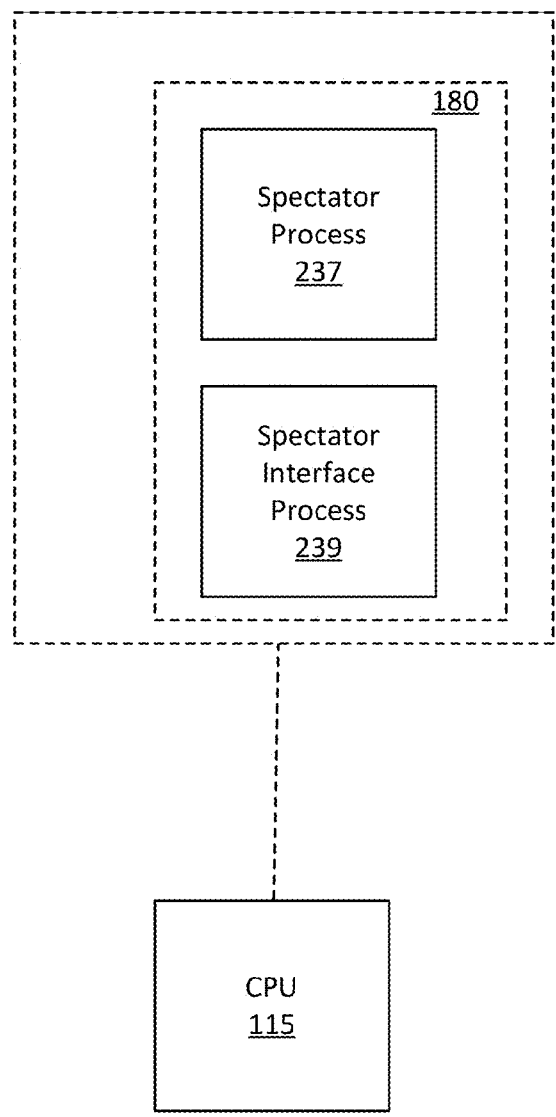
FIG. 2E shows an exemplary architecture of a universal spectator client according to one embodiment.

FIG. 2E shows an exemplary architecture of a universal spectator client according to one embodiment. Universal client 180 may allow a user operating a particular device to act as a spectator with respect to particular video game titles running on devices associated with users acting as participants regardless of whether the spectator has the same game titles as the participant installed on their device and regardless of whether the spectator is utilizing the same platform as the participant.

Universal spectator client 180 may be executed by a CPU 115 on a device associated with a spectator. Universal spectator client 180 may comprise spectator process 237 and spectator interface process. As described in detail below, spectator process 237 may act to receive shared multimedia information from participants who desire to share game play sessions and display that information on the associated spectator device. Spectator interface process 239 as described below may act to display a list of participants and associated video games that the spectator may observe as well as provide other interface functionality to allow the spectator to initiate, terminate or configure spectator sessions.

Figure 2F:
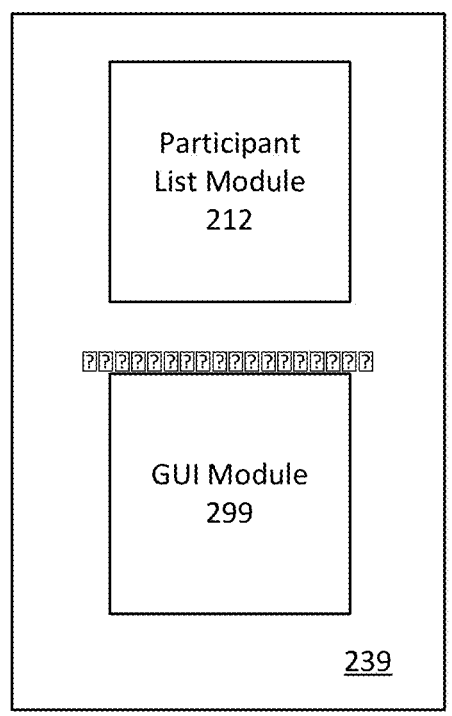
FIG. 2F shows an exemplary architecture of a spectator interface process according to one embodiment.

FIG. 2F shows an exemplary architecture of a spectator interface process according to one embodiment. Spectator interface process 239 may comprise participant list module 212 and GUI module 299. Participant list process 212 may update information to a spectator regarding participants that are online and wish to share game play for a particular game. As will be described in detail below, a participant may allow or disallow certain other users from acting as spectators with respect to particular games. GUI module 299 may provide functionality for displaying a user interface for a universal client process as described in detail below.

Participant list module 212 may retrieve a list of all participants sorted by game that are currently online via, for example, spectator server 294 shown in FIG. 1B as described below. GUI module 299 may display the retrieved information using a dedicated spectator GUI described in detail below.

Figure 3:
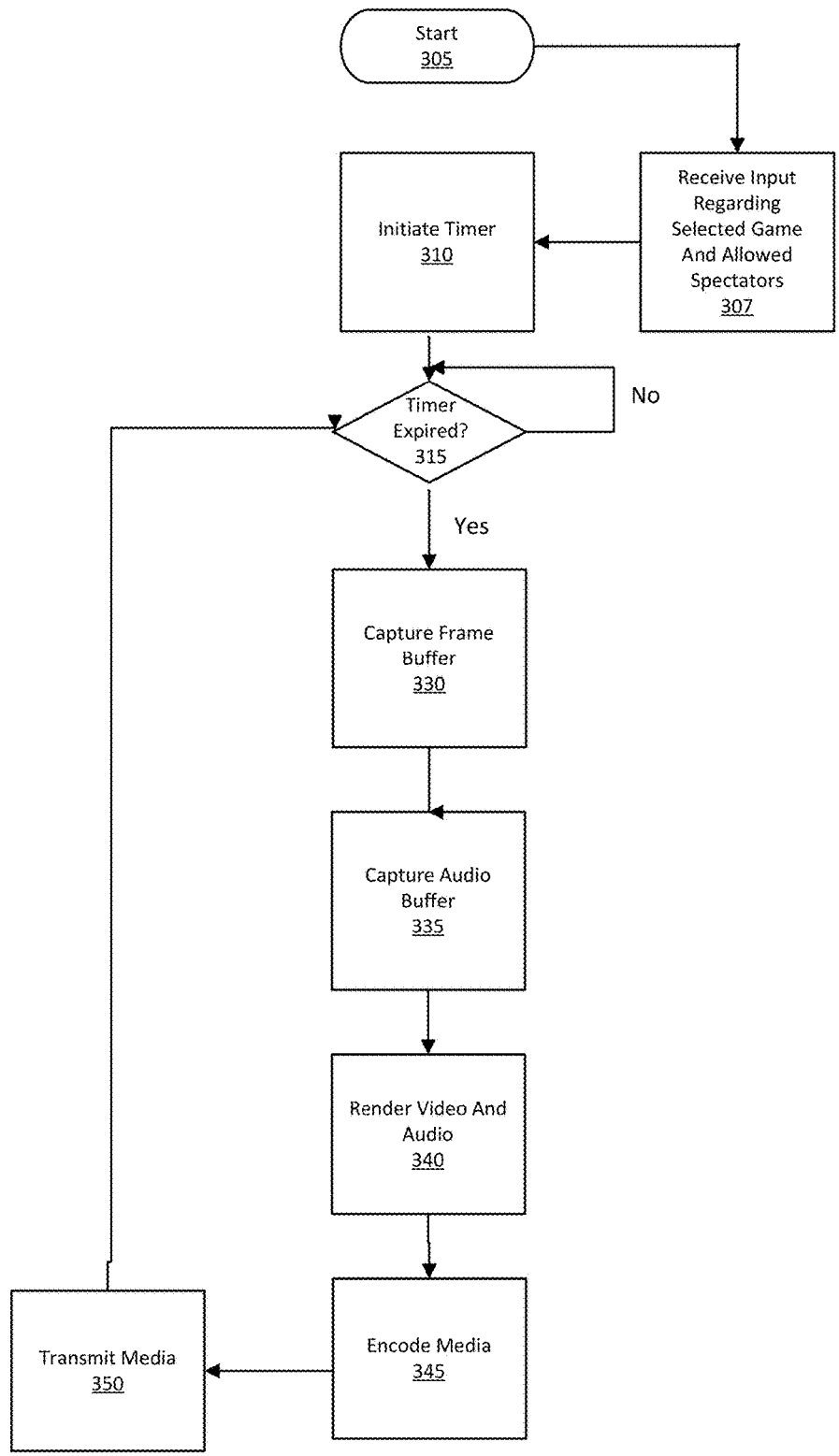
FIG. 3 is a flowchart of an exemplary process executed by a participant process in order to capture and distribute to spectators multimedia information relating to video games running on a device.

FIG. 3 is a flowchart of an exemplary process executed by a participant process in order to capture and distribute to spectators multimedia information relating to video games running on a device. The process is initiated in 305 and may be initiated when a participant elects to share a video game experience with one or more spectators. In 307, input is received from a participant regarding a selected game for which the participant desires to share multimedia game play information as well as a list of allowed spectators who may observe the game. According to one embodiment, this information may be captured by a participant interface process 230 described above with respect to FIG. 2A. The information may be propagated to spectator server 294 to update a spectator database regarding the allowed spectators. In 310, a timer is initiated. In 315, it is determined whether the timer has expired. If not ('No' branch of 315) flow continues with 315 and the timer is checked again. If so ('Yes" branch of 315), in 330 video data currently in the frame buffer is captured. In 335, audio data currently in the audio buffer is captured. In 340, the video and audio data respectively captured from the video and audio buffers is rendered into a composite multimedia signal. In 345, the multimedia signal is encoded using any number of encoding, compression and/or encryption schemes. In 350, the encoded signal is transmitted over a network to spectators selected in step 307.

Figure 4A:
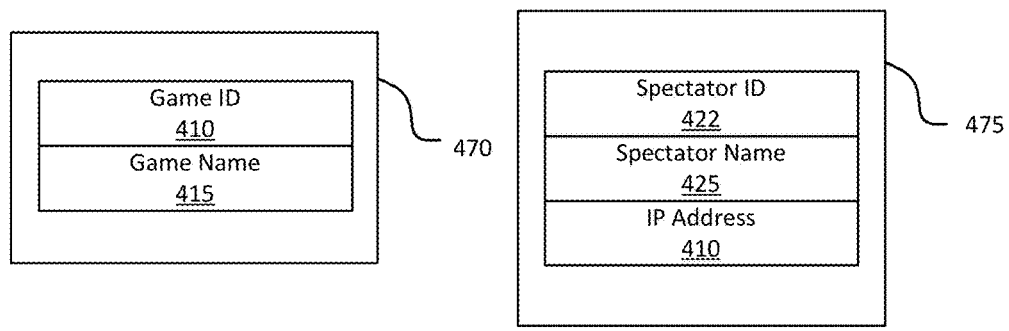
FIG. 4A is a schema of an exemplary spectator database that may be deployed at a spectator server.
Figure 4A:
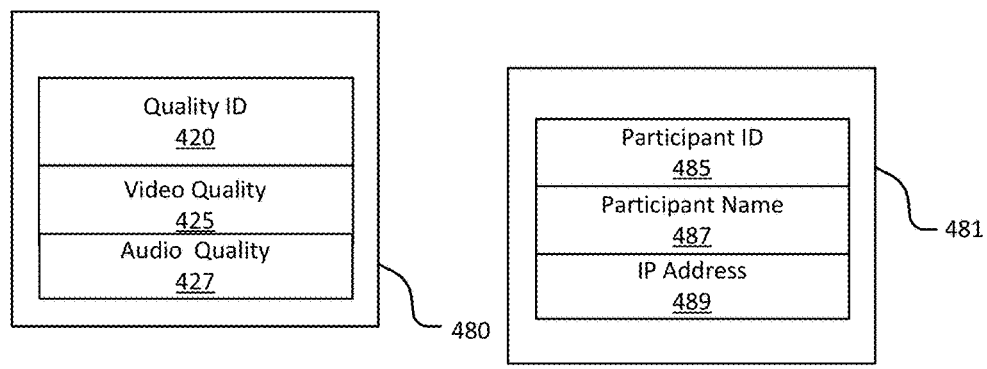
Figure 4A:
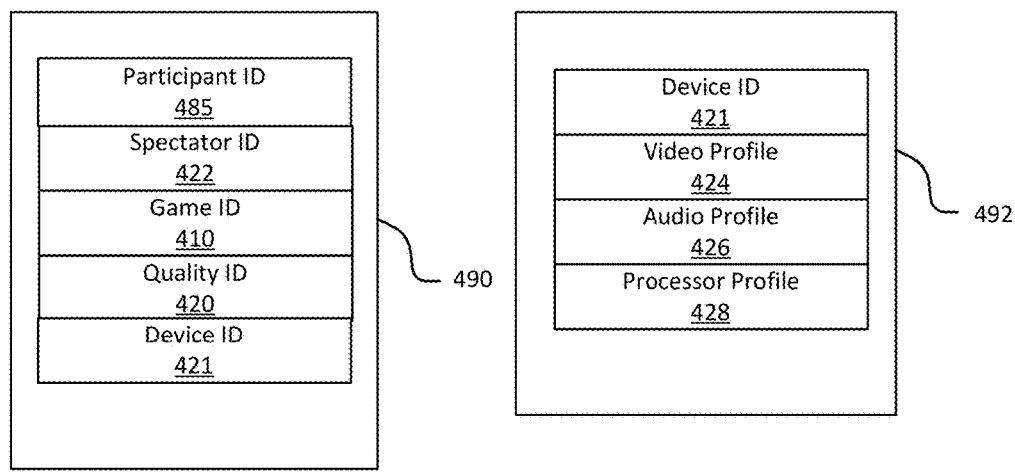

FIG. 4A is a schema of an exemplary spectator database that may be deployed at a spectator server. Spectator database schema 407 may include spectator table 475, participant table 481, game table 470, quality table 480, allowed spectator table 490, and device table 492.

Spectator table 475 may store information regarding spectators and may include spectator ID field 422, spectator name field 425 and IP address field 410. Spectator ID field 422 may store a unique identifier for a spectator. Spectator name field 425 may store an alphanumeric string representing a name of a spectator. IP address field 410 may store a current IP address associated with a spectator.

Participant table 481 may store information regarding participants and may include participant ID field 485, participant name field 487 and IP address field 489. Participant ID field 485 may store a unique identifier for a participant. Participant name field 487 may store an alphanumeric string representing a name of a participant. IP address field 489 may store a current IP address associated with a participant.

Game table 470 may store information regarding particular game titles and may include game ID field 410 and game name field 415. Game ID field may store a unique identifier for a game. Game name field 415 may store an alphanumeric string representing the name of a game.

Device table 492 may store information relating to particular devices associated by users. Device table 492 may include device ID field 421, video profile field 424, audio profile 426 and processor profile 428. Device ID field 421 may store a unique identifier for a device. Video profile field 424 may store information regarding the video capabilities of the corresponding device including such information as screen resolution, etc. Audio profile 426 may information relating to the corresponding audio capabilities of the device. Processor profile 428 may store information regarding the capabilities of the processor associated with the device such as the clock speed, etc.

Quality table 480 may store information regarding quality of content to be delivered to a spectator. Quality ID field 420 stores a unique ID for a quality. Video quality 425 stores a parameter indicating a desired video quality. The video quality parameter stored in 425 may specify a resolution, bit rate, compression ratio, etc. Audio quality field 427 stores a parameter indicating a desired audio quality. The video quality parameter stored in 427 may specify a bit rate, compression ratio, etc.

Allowed spectator table 490 may associate participants with allowed spectators for particular video games. Allowed spectator table 490 may include participant ID field 485, spectator ID field 422, game ID field 410, quality ID field 420 and device ID field 421. Thus, allowed spectator table 490 may relate a participant ID 485 to a spectator ID 422 with respect to a game ID 410 that the spectator may observe at a specific quality ID 420 and on a specific device ID 420.

Figure 4B:
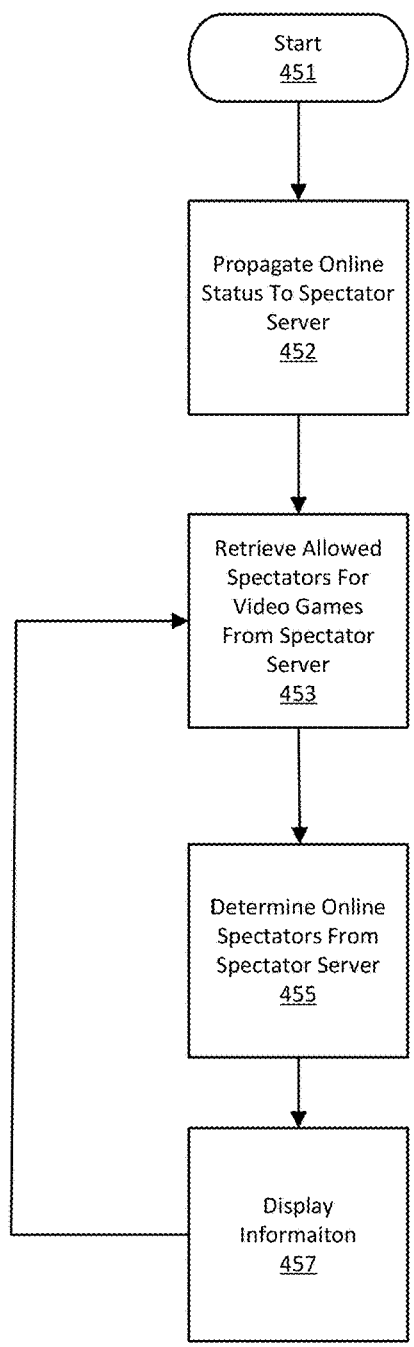
FIG. 4B shows an exemplary process executed by a spectator list module that may be part of a participant system.

FIG. 4B shows an exemplary process executed by a spectator list module that may be part of a participant system. It is assumed for this example that a participant system is deployed on a device associated with a user that desires to act as a participant with respect to one or more video games. It is further assumed that spectators may utilize a device with universal spectator client 180 installed. Universal spectator client 180 may perform actions to propagate information regarding the online status of spectators to spectator server 294 as described below with respect to FIG. 4C.

Spectator list module 285 may operate to retrieve information regarding allowed online spectators from spectator server 294 as well as propagate the online status of the participant to spectator server 294. The process is initiated in 451. In 452, spectator list module 285 may transmit online status of the participant to spectator server 294. This information may be used to allow potential spectators to learn that a participant for particular games and is online. In particular, spectator server 294 may receive the online status information of the participant and update spectator database 237 to reflect that the participant is online. Spectator server 294 may update the IP address field 489 of participant table 481 to indicate that the participant is online. Setting IP address field 489 of participant table 481 to 'NULL' may indicate that the participant is offline.

In 453, spectator list module 285 may retrieve a list of all allowed spectators for all games on the participant's device on which spectator list module is currently running from spectator server 294. This information may be retrieved from spectator database 237 at spectator server 294 and in particular, allowed spectator table 490. Once this information is retrieved, spectator list module 285 may poll spectator server 294 to determine which of the allowed spectators are currently online and their respective IP addresses. In 457, the information retrieved from spectator server 294 may be displayed to the participant via spectator interface process 230.

Figure 4C:
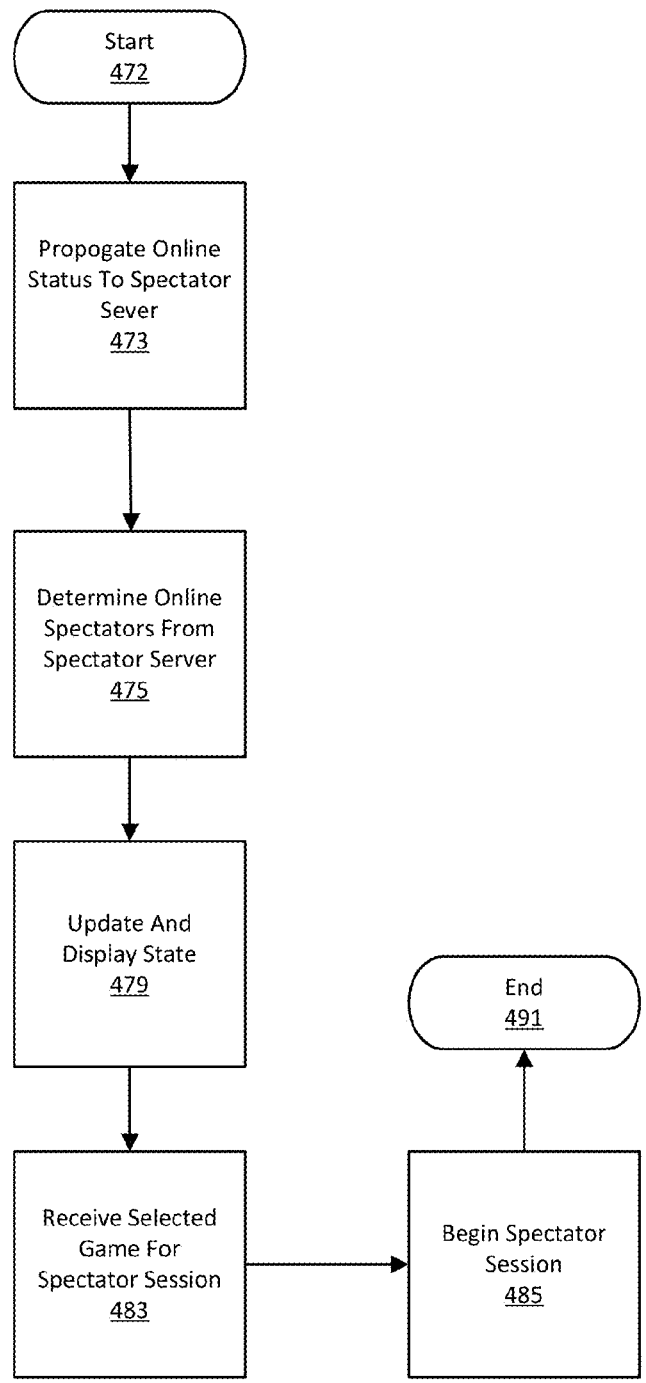
FIG. 4C shows an exemplary process executed by a participant list module that may be part of a universal spectator client.

FIG. 4C shows an exemplary process executed by a participant list module that may be part of a universal spectator client. It is assumed for this example that a universal client module 180 is deployed on a device associated with a user that desires to act as a spectator with respect to one or more video games. It is further assumed that participants may utilize a device with a spectator system 220 installed. As described above, spectator system 220 may perform actions to propagate information regarding the online status of the respective participant to spectator server 294 so spectators using universal client 180 may learn of this status by polling spectator server 294 and initiate a spectator session.

Participant list module 212 may operate to retrieve information regarding allowed online participants from spectator server 294 as well as propagate the online status of the spectator on which the universal spectator client is installed. The process is initiated in 472. In 473, the online status of the spectator is transmitted to spectator server 294 to allow potential participants to learn that the user is a spectator in particular games and is online. In particular, spectator server 294 may receive the online status information of the participant and update spectator database 237 to reflect that the participant is online. Spectator server 294 may update the IP address field 410 of spectator table 489 to indicate that the spectator is online. Setting IP address field 410 of spectator table 489 to 'NULL' may indicate that the spectator is offline. In 475, participant list module 212 may retrieve a list of all allowed participants and associated online status information for which the spectator is allowed to serve as a spectator. This information may be retrieved from spectator database 237 at spectator server 294 and in particular, allowed spectator table 490. In 479, the information retrieved from spectator server 294 is displayed on universal spectator client 180 in a GUI. This process may be performed by GUI module 299.

In 483 participant list module may receive a desired game for a game that the spectator is allowed and the spectator wishes experience. In 485, the spectator session is initiated. This may involve transmitting certain information to spectator server 294 and requesting permission from the participant of the requested video game. The process ends in 491.

Figure 4D:
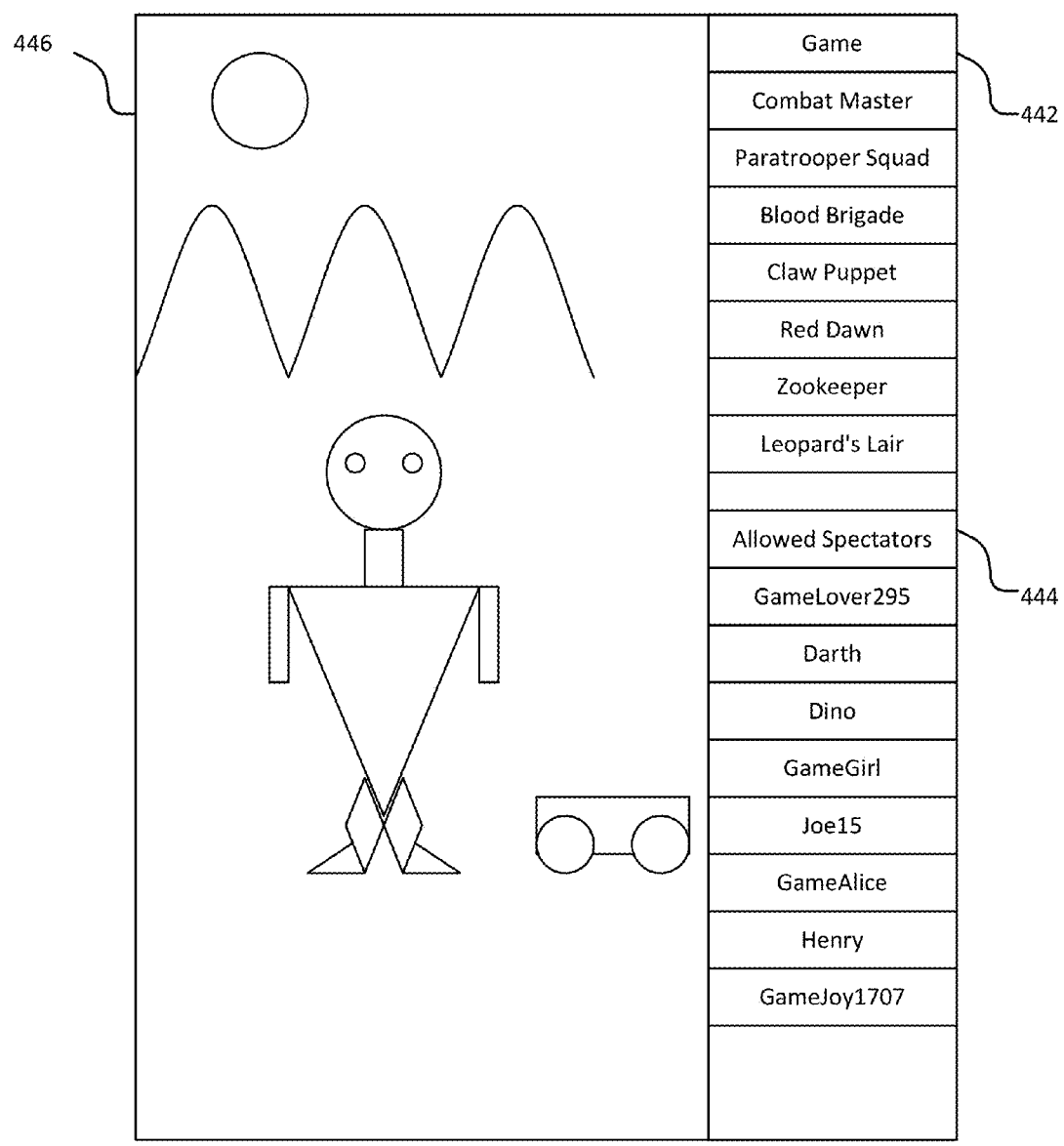
FIG. 4D shows an exemplary participant interface GUI that may be generated by a GUI module that may be part of a participant interface process.

FIG. 4D shows an exemplary participant interface GUI that may be generated by a GUI module that may be part of a participant interface process. Participant interface 461 may be displayed on a device on which a user plays a video game and may desire to share the video game experience with various spectators. The participant interface 461 may comprise a game play pane 446, a game pane 442 and an allowed spectators pane 444. Game play pane 446 may show the actual game play as the participant plays a game. Game pane 442 may allow a user to select a particular game for play. Allowed spectators pane 444 may show allowed spectators for the game. Thus, the exemplary display in FIG. 4B shows that a user has selected a game "Claw Puppet" for play and the allowed spectators for "Claw Puppet" are GameLover295, Darth, Dino, GameGirl, Joe15, GameAlice, Henry and GameJoy1707. Participant interface may allow the participant to select those particular allowed spectators for which the participant desires to share a game play session. This information may be received by participant interface, which may then cause a participant process 220 to begin sharing the game play with the particular users selected.

According to an alternative embodiment, one or more spectators may indicate a desire to receive multimedia information regarding an upcoming multimedia session but may in fact not be online during the actual occurrence of the session. The spectators may provide an indication to a user of a multimedia system hosting the session that they would desire to view the session. Upon commencement of the session, the system may determine whether the interested spectators are online. If they are not online during the session, the system may cause the storage of the multimedia information generated during the session. At a later time, upon receiving a signal that the interested spectators are online, the system may initiate streaming of the stored multimedia information to the interested spectators.

Figure 5:
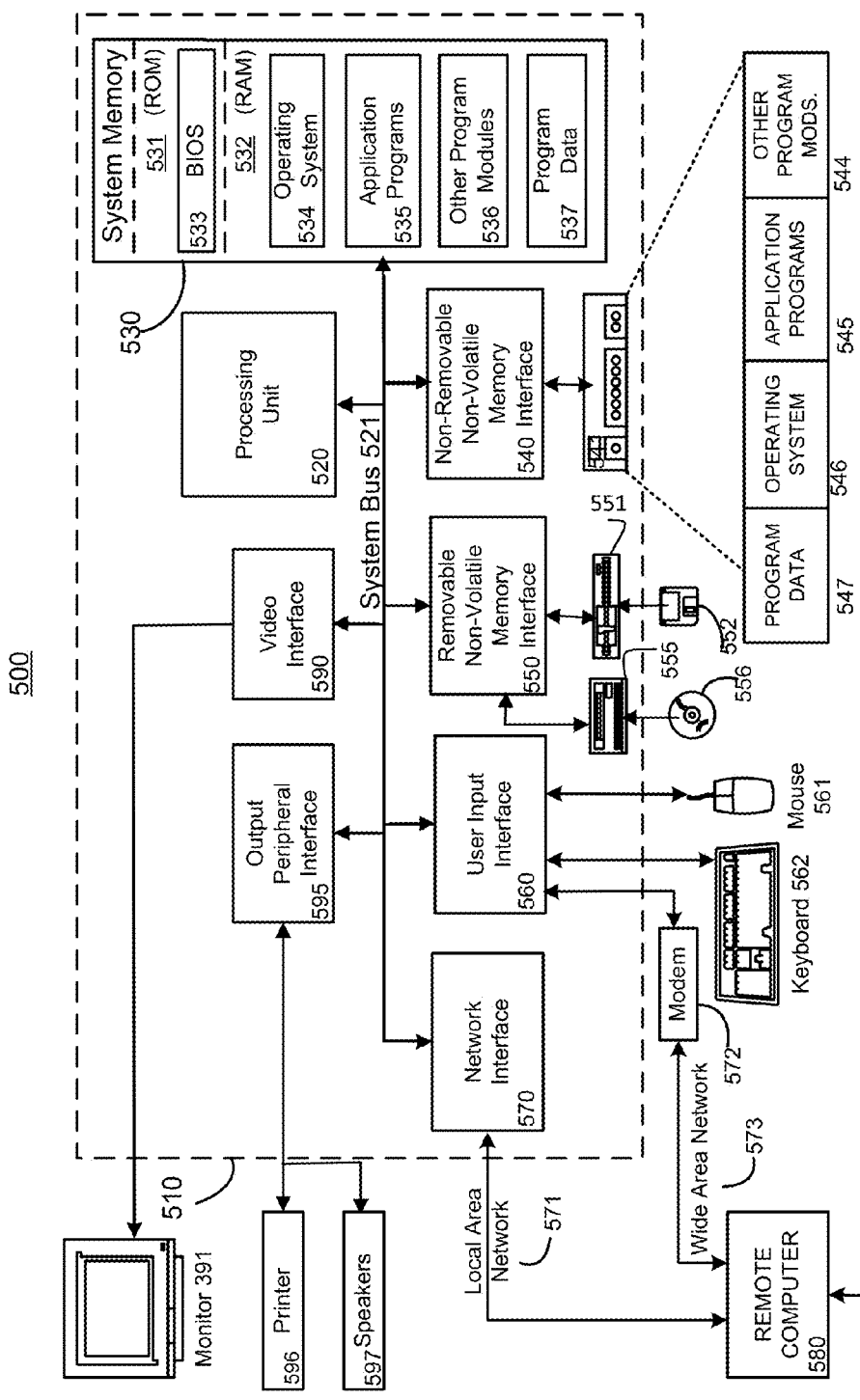
FIG. 5 shows an exemplary computing environment in which aspects of the example embodiments may be implemented.

FIG. 5 shows an exemplary computing environment in which aspects of the example embodiments may be implemented. Computing system environment 500 is only one example of a suitable computing environment and is not intended to suggest any limitation as to the scope of use or functionality of the described example embodiments. Neither should computing environment 500 be interpreted as having any dependency or requirement relating to any one or combination of components illustrated in exemplary computing environment 500.

The example embodiments are operational with numerous other general purpose or special purpose computing system environments or configurations. Examples of well known computing systems, environments, and/or configurations that may be suitable for use with the example embodiments include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The example embodiments may be described in the general context of computer-executable instructions, such as program modules, being executed by a computer. Generally, program modules include routines, programs, objects, components, data structures, etc. that perform particular tasks or implement particular abstract data types. The example embodiments also may be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing the example embodiments includes a general purpose computing device in the form of a computer 510. Components of computer 510 may include, but are not limited to, a processing unit 520, a system memory 530, and a system bus 521 that couples various system components including the system memory to processing unit 520. Processing unit 520 may represent multiple logical processing units such as those supported on a multi-threaded processor. System bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). System bus 521 may also be implemented as a point-to-point connection, switching fabric, or the like, among the communicating devices.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

System memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

Computer 510 may also include other removable/non-removable, volatile/nonvolatile computer storage media. By way of example only, FIG. 6 illustrates a hard disk drive 540 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 541 is typically connected to system bus 521 through a non-removable memory interface such as interface 540, and magnetic disk drive 551 and optical disk drive 555 are typically connected to system bus 521 by a removable memory interface, such as interface 550.

The drives and their associated computer storage media discussed above and illustrated in FIG. 5, provide storage of computer readable instructions, data structures, program modules and other data for computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to processing unit 520 through a user input interface 560 that is coupled to the system bus, but may be connected by other interface and bus structures, such as a parallel port, game port or a universal serial bus (USB). A monitor 591 or other type of display device is also connected to system bus 521 via an interface, such as a video interface 590. In addition to the monitor, computers may also include other peripheral output devices such as speakers 597 and printer 596, which may be connected through an output peripheral interface 595.

Computer 510 may operate in a networked environment using logical connections to one or more remote computers, such as a remote computer 580. Remote computer 580 may be a personal computer, a server, a router, a network PC, a peer device or other common network node, and typically includes many or all of the elements described above relative to computer 510, although only a memory storage device 581 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, computer 510 is connected to LAN 571 through a network interface or adapter 570. When used in a WAN networking environment, computer 510 typically includes a modem 572 or other means for establishing communications over WAN 573, such as the Internet. Modem 572, which may be internal or external, may be connected to system bus 521 via user input interface 560, or other appropriate mechanism. In a networked environment, program modules depicted relative to computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Computing environment 500 typically includes at least some form of computer readable media. Computer readable media can be any available media that can be accessed by computing environment 500. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing environment 500. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the subject matter has been described in language specific to the structural features and/or methodological acts, it is to be understood that the subject matter defined in the appended claims is not necessarily limited to the specific features or acts described above. Rather, the specific features or acts described above are disclosed as example forms of implementing the claims.

The inventive subject matter is described with specificity to meet statutory requirements. However, the description itself is not intended to limit the scope of this patent. Rather, it is contemplated that the claimed subject matter might also be embodied in other ways, to include different steps or combinations of steps similar to the ones described in this document, in conjunction with other present or future technologies.

What is claimed:

1. A method performed at a participant computing system for providing media information to a remote network spectator via a network, the media information generated at the participant computing system by a participant of a multimedia game application executing on the participant computing system, the method comprising:
    displaying the media information to the participant via a display of the participant computing system;
    via one or more processors of the participant computing system, setting a timer;
    upon expiration of the timer, via one or more processors of the participant computing system, capturing current media information from the application, wherein capturing current media information is performed by bypassing a rendering buffer of the participant computing system;
    via one or more processors of the participant computing system, encoding the current media information for transmission over the network; and
    via one or more processors of the participant computing system, transmitting the current media information over the network to at least one spectator.

2. The method of claim 1, further comprising:
    associating the participant with the at least one spectator of a plurality of spectators;
    determining online status for each spectator of the plurality of spectators; and
    providing information to the participant indicating the online status for each spectator of the plurality of spectators.

3. The method of claim 1, further comprising receiving permission information for the participant for each of at least one user, the permission information indicating whether each user may act as a spectator for a particular multimedia game application.

4. The method of claim 1, wherein the media information comprises video information and audio information captured respectively from a frame buffer and an audio buffer.

5. The method of claim 1, wherein the encoding the current media information further comprises compressing the current media information.

6. The method of claim 1, further comprising displaying a GUI to the participant, the GUI indicating an online or offline status for each of at least one spectator.

7. The method of claim 6, further comprising retrieving one of online and offline status for each spectator from a network server.

8. The method of claim 6, further comprising storing one of online and offline status for each spectator and the participant.

9. A system for providing media information to a remote network spectator via a network, the media information generated at the system by a participant of a multimedia game application executing on the system, the system comprising:

a display; and a processor adapted to perform operations comprising:

displaying the media information to the participant via the display of the system;

via one or more processors of the system, setting a timer;

upon expiration of the timer, via one or more processors of the system, capturing current media information from the application, wherein capturing current media information is performed by bypassing a rendering buffer of the participant computing system;

via one or more processors of the system, encoding the current media information for transmission over the network; and via one or more processors of the system, transmitting the current media information over the network to at least one spectator.

10. The system of claim 9, wherein the operations further comprise:

associating the participant with the at least one spectator of a plurality of spectators;

determining online status for each spectator of the plurality of spectators; and providing information to the participant indicating the online status for each spectator of the plurality of spectators.

11. The system of claim 9, wherein the operations further comprise receiving permission information for the participant for each of at least one user, the permission information indicating whether each user may act as a spectator for a particular multimedia game application.

12. The system of claim 9, wherein the media information comprises video information and audio information captured respectively from a frame buffer and an audio buffer.

13. The system of claim 9, wherein the encoding the current media information further comprises compressing the current media information.

14. The system of claim 9, wherein the operations further comprise displaying a GUI to the participant, the GUI indicating an online or offline status for each of at least one spectator.

15. A computer-readable storage medium bearing computer-executable instructions for performing operations at a participant computing system to cause media information to be provided to a remote network spectator via a network, the media information generated at the participant computing system by a participant of a multimedia game application executing on the participant computing system, the operations comprising:

causing the media information to be displayed to the participant via a display of the participant computing system;

setting a timer;

upon expiration of the timer, capturing current media information from the multimedia game application, wherein capturing current media information is performed by bypassing a rendering buffer of the participant computing system;

encoding the current media information for transmission over a network; and transmitting the current media information over the network to at least one spectator.

16. The computer-readable storage medium of claim 15, wherein the operations further comprise:

associating the participant with the at least one spectator of a plurality of spectators;

determining online status for each spectator of the plurality of spectators; and providing information to the participant indicating the online status for each spectator of the plurality of spectators.

17. The computer-readable storage medium of claim 16, wherein the operations further comprise receiving permission information for the participant for each of at least one user, the permission information indicating whether each user may act as a spectator for a particular multimedia game application.

18. The computer-readable storage medium of claim 15, wherein the media information comprises video information and audio information captured respectively from a frame buffer and an audio buffer.

19. The computer-readable storage medium of claim 15, wherein the encoding the current media information further comprises compressing the current media information.

20. The computer-readable storage medium of claim 16, wherein the operations further comprise displaying a GUI to the participant, the GUI indicating an online or offline status for each of at least one spectator.

* * * * *